(12) United States Patent
Cuzin

(10) Patent No.: US 9,505,241 B2
(45) Date of Patent: Nov. 29, 2016

(54) CONVEYOR BELT FOR PLATE ELEMENTS AND CONVERTING MACHINE COMPRISING SUCH A BELT

(71) Applicant: BOBST LYON, Villeurbanne (FR)

(72) Inventor: Marc Cuzin, St. Genis les Ollieres (FR)

(73) Assignee: BOBST LYON (FR)

( * ) Notice: Subject to any disclaimer, the term of this patent is extended or adjusted under 35 U.S.C. 154(b) by 0 days.

(21) Appl. No.: 14/655,492

(22) PCT Filed: Dec. 19, 2013

(86) PCT No.: PCT/EP2013/003866
§ 371 (c)(1),
(2) Date: Jun. 25, 2015

(87) PCT Pub. No.: WO2014/101993
PCT Pub. Date: Jul. 3, 2014

(65) Prior Publication Data
US 2016/0193855 A1     Jul. 7, 2016

(30) Foreign Application Priority Data

Dec. 28, 2012 (FR) ...................................... 12 62946

(51) Int. Cl.
| | | |
|---|---|---|
| *B65G 17/46* | (2006.01) | |
| *F16G 3/00* | (2006.01) | |
| *B41J 11/00* | (2006.01) | |
| *F16G 3/02* | (2006.01) | |

(Continued)

(52) U.S. Cl.
CPC .......... *B41J 11/007* (2013.01); *B65G 21/2036* (2013.01); *F16G 3/02* (2013.01); *F16G 3/04* (2013.01)

(58) Field of Classification Search
CPC ................................. F16G 3/00; B65G 17/46
USPC ........................................... 198/689.1, 844.1
See application file for complete search history.

(56) References Cited

U.S. PATENT DOCUMENTS

| | | | | | |
|---|---|---|---|---|---|
| 2,056,278 A | * | 10/1936 | Kuhn | ...................... | A41F 9/002 24/38 |
| 3,729,873 A | * | 5/1973 | Sandell | .................. | B24D 11/06 451/531 |
| 4,050,322 A | * | 9/1977 | Moring | ..................... | F16G 3/10 474/254 |

(Continued)

FOREIGN PATENT DOCUMENTS

| | | |
|---|---|---|
| DE | 36 26 244 A1 | 2/1988 |
| DE | 20 2012 008090 U1 | 9/2012 |

(Continued)

OTHER PUBLICATIONS

International Search Report dated Apr. 11, 2014 issued in corresponding International patent application No. PCT/EP2013/003866.

*Primary Examiner* — Douglas Hess
(74) *Attorney, Agent, or Firm* — Ostrolenk Faber LLP

(57) ABSTRACT

A conveyor belt for conveying plate elements in a machine for converting the elements that includes a belt body with longitudinal edges, joining edges, and a support surface for supporting the elements, and at least one assembly member arranged to join the joining edges, and extending in a direction of assembly which is oblique to the longitudinal direction, the belt body having a plurality of perforations for obtaining a vacuum on the support surface to immobilize the elements.

17 Claims, 4 Drawing Sheets

(51) Int. Cl.
*F16G 3/04* (2006.01)
*B65G 21/20* (2006.01)

(56) References Cited

U.S. PATENT DOCUMENTS

| | | | | |
|---|---|---|---|---|
| 4,215,516 A * | 8/1980 | Huschle | ............... | B24D 11/06 156/304.3 |
| 5,020,658 A * | 6/1991 | Jager | ............... | A01D 17/10 198/844.2 |
| 5,951,441 A * | 9/1999 | Dalebout | ............... | A63B 22/02 198/844.2 |
| 6,353,724 B1 * | 3/2002 | Thornton | ............... | B29C 65/56 399/302 |
| 6,931,773 B2 * | 8/2005 | Bihr | ............... | G09F 11/24 40/514 |
| 7,028,833 B2 * | 4/2006 | Halterbeck | ............... | B65G 15/00 198/844.2 |
| 7,083,037 B2 * | 8/2006 | Durrer | ............... | B29C 65/5042 198/335 |
| 7,267,219 B2 * | 9/2007 | Vogt | ............... | F16G 3/10 198/844.1 |
| 7,792,390 B2 * | 9/2010 | Prakash | ............... | H04N 19/50 382/302 |
| 7,980,979 B2 * | 7/2011 | Jakob | ............... | F16G 3/08 198/844.2 |
| 8,002,110 B2 * | 8/2011 | DeGroot | ............... | B29C 65/564 198/844.2 |
| 8,361,584 B2 * | 1/2013 | Coghlan | ............... | D21F 1/0054 139/383 AA |
| 8,365,906 B2 * | 2/2013 | Moeschen-Siekmann | ............... | F16G 3/09 198/844.2 |
| 8,490,272 B1 * | 7/2013 | Langsdorf | ............... | B65G 15/02 198/839 |
| 8,695,783 B2 * | 4/2014 | Gilmartin | ............... | B29D 29/06 198/689.1 |
| 8,708,135 B2 * | 4/2014 | Lin | ............... | B29D 29/06 198/689.1 |
| 9,321,592 B2 * | 4/2016 | Tajima | ............... | B65G 15/34 |

FOREIGN PATENT DOCUMENTS

| | | |
|---|---|---|
| EP | 1 477 704 A2 | 11/2004 |
| JP | 2003 156102 | 5/2003 |
| WO | WO 90/10165 A1 | 9/1990 |

* cited by examiner

CONVEYOR BELT FOR PLATE ELEMENTS AND CONVERTING MACHINE COMPRISING SUCH A BELT

CROSS-REFERENCE TO RELATED APPLICATIONS

The present application is a 35 U.S.C. §371 national phase conversion of PCT/EP2013/003866, filed Dec. 19, 2013, which claims priority of French Application No. 1262946, filed Dec. 28, 2012. The contents of both applications are incorporated by reference herein. The PCT International Application was published in the French language.

FIELD OF THE INVENTION

The present invention relates to a conveyor belt for conveying plate elements in a machine for converting the plate elements, and a converting machine such as a printing, folding and gluing machine comprising at least one such conveyor belt.

FIELD OF APPLICATION

The present invention applies to the field of converting cardboard in plate form, namely cardboard sheets, to produce packaging boxes or cases. Plate elements in cardboard sheet form are inserted one after the other into the converting machine, moving continuously in the direction of travel. They are automatically printed by flexography, cut and creased, folded and assembled by gluing, to form the cases.

DEFINITION

In the present application, the term "plate element" refers to a generally flat product consisting of at least one material, such as paper, cardboard or polymer, which can be printed and used to form packaging containers. The term "plate element" thus refers to sheets of cardboard, corrugated cardboard, laminated corrugated board, plate cardboard, flexible plastic, such as polyethylene (PE), polyethylene terephthalate (PET) and biaxially oriented polypropylene (BOPP).

BACKGROUND

Converting machines comprise wide endless conveyor belts for conveying plate cardboard in a converting machine. The width of the belt is about 2 m. Such a conveyor belt comprises a flexible belt body and has two longitudinal edges and two joining edges. The joining edges are joined together by adhesive. Once the joining edges have been adhesively bonded, the belt takes the form of a closed loop, and can be driven in an endless loop by drive members of the converting machine.

In general, a converting machine operates continuously for long stretches of time, often 24 hours a day. The belt has a service life of about 1 to 2 years, due to wear by the cardboards and loss of mechanical properties. The end of the service life of a belt may be planned or unplanned, depending on whether the belt is scheduled for replacement before it breaks or whether it breaks unexpectedly.

However, for the purpose of replacement, the prior art belt is delivered as a closed loop, i.e. with the joining edges already adhesively bonded together. To fit the new belt, it is necessary to dismantle many components of the converting machine, in particular the belt drive shafts. The new belt is then fitted and the components that were dismantled previously are reassembled.

Therefore, replacement of a prior art belt takes about 48 hours, which represents a long interruption of production. Such a long interruption of production is particularly disruptive when the belt breaks unexpectedly.

PRIOR ART

A conveyor belt with two joining edges and an assembly member is known from documents JP 2003156102, DE 202012008090, WO 90/10165 and EP 1477704. The joining edges and the member lie obliquely to the longitudinal direction.

However, such a conveyor belt cannot be used in a converting machine in which a plate element must be held firmly and precisely in place against the belt.

SUMMARY OF THE INVENTION

It is a primary aim of the present invention to provide a conveyor belt that can be easily fitted and dismantled. The present invention aims in particular to solve, completely or partially, the problems mentioned above. Yet another aim is to fit a conveyor belt in a machine for converting plate elements. A conveyor belt is designed to convey plate elements in a machine for converting the plate elements. The conveyor belt comprises a belt body. The belt body has longitudinal edges, joining edges, and a support surface shaped for supporting the elements. The conveyor belt comprises at least one assembly member arranged to join the joining edges. The assembly member extends in a direction of assembly which is oblique to the longitudinal direction.

The belt body has a plurality of perforations for obtaining a vacuum on the support surface to immobilize the plate elements on the support surface.

The longitudinal direction is defined with reference to the drive direction or direction of travel of the plate elements in the converting machine, along the median longitudinal axis thereof, with the conveyor belt.

The term "register" denotes the position of the plate elements with respect to the converting devices included in the converting machine. In particular, in the case of a four-color printing machine, the register means that the four colors applied to a plate element must overlap precisely.

Thus, such a conveyor belt, while maintaining correct register, improves the productivity of the converting machine because the time required to replace the conveyor belt is significantly reduced by virtue of the fact that it is joined up using an assembly member.

To be specific, the conveyor belt is supplied unrolled, i.e. with the joining edges free, as it has not yet been assembled. Therefore, to fit a conveyor belt according to the invention in the converting machine only a small number of components of the converting machine need to be dismantled. Typically, the time needed to replace a conveyor belt according to the invention may be about 2 hours, instead of 48 hours for a prior art belt. This time is reduced in the case of both scheduled and unscheduled intervention.

The perforations keep the plate elements firmly pressed against the belt body. The register is thus guaranteed both due to the oblique assembly, which reduces sideways movement of the driven belt body, and due to the vacuum keeping the plate elements in place with respect to the converting devices, which perform an action on said plate elements.

According to yet another aspect of the invention, a machine for converting plate elements, such as a printing machine, comprises at least one conveyor belt having one or more technical features described and claimed below, mounted around a chamber capable of generating a vacuum on the support surface of the belt body.

Thus, such a converting machine can offer increased production time and improved cost efficiency, because of the reduction in the time for which production is interrupted to replace the conveyor belt. The register is maintained by virtue of the depression or vacuum chamber.

BRIEF DESCRIPTION OF THE DRAWINGS

The present invention will be better understood and the advantages thereof will also be apparent from the following description, provided purely by way of non-limiting example and with reference to the accompanying drawings, in which.

DETAILED DESCRIPTION OF THE PREFERRED EMBODIMENTS

Figure 1:
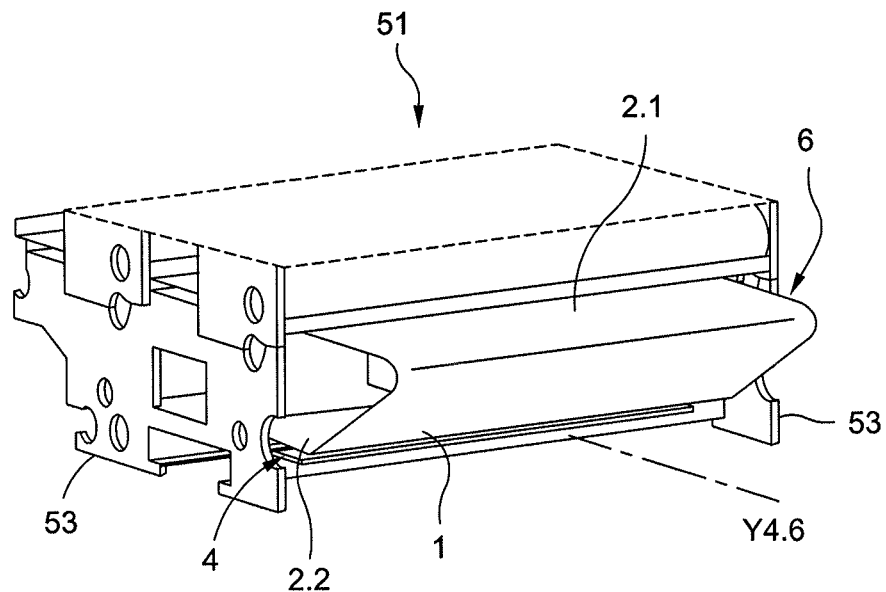
FIG. 1 is a partial perspective view of a converting machine comprising a conveyor belt according to the invention.
Figure 2:
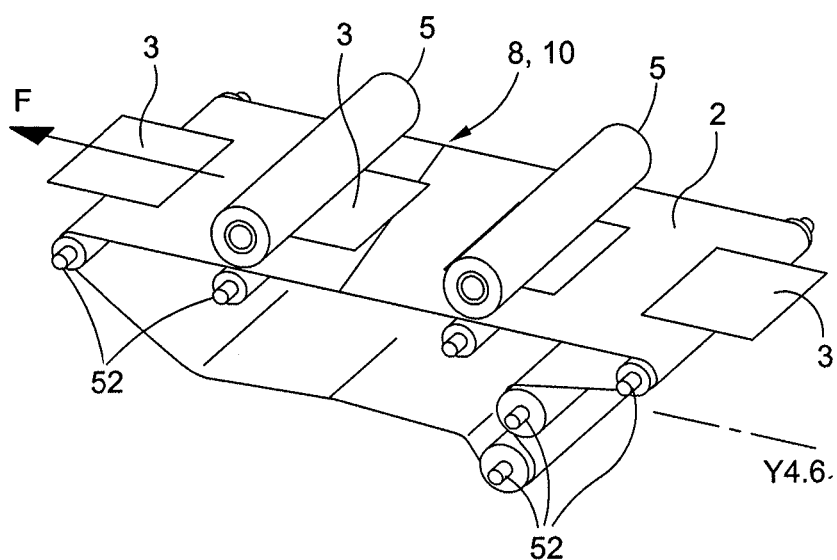
FIG. 2 is a perspective view of the conveyor belt, fitted in the converting machine of FIG. 1.

As shown in FIGS. 1 and 2, a converting machine 51 includes a conveyor belt 1. The converting machine 51 is in this case a four-color printing machine, in particular for printing color patterns on plate elements, i.e. plate cardboards 3. The cardboards 3 are conveyed by the belt 1 (arrow F in FIG. 2), in a longitudinal direction Y4.6. The printing machine 51 comprises successive printing cylinders 5, such as plate cylinders for flexographic printing.

The machine 51 includes a series of drive, return and tensioning rollers 52, for driving the belt 1 and keeping it tensioned. These rollers 52 are held rotatably by bearings and side frames 53. A vacuum chamber or chamber able for generating a depression is mounted beneath the belt 1 between the frames 53.

Figure 3:
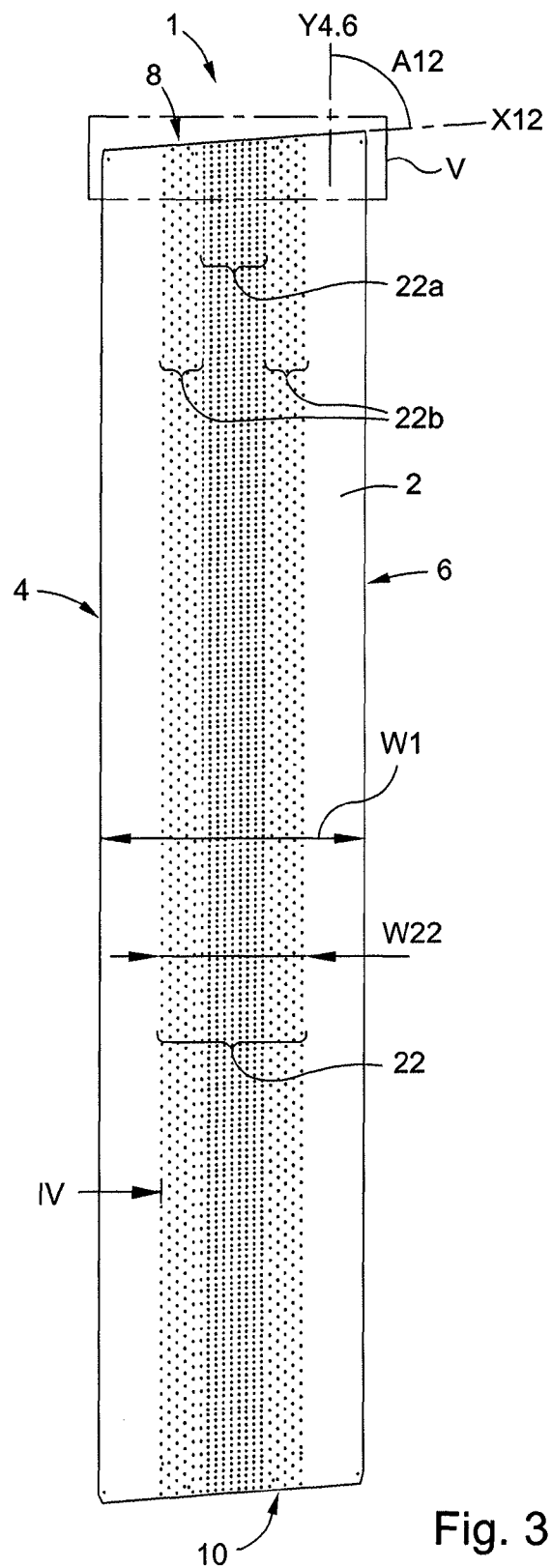
FIG. 3 is a top view of the unrolled conveyor belt.

As shown in FIG. 3, the conveyor belt 1 comprises a belt body 2, which in this case is three-ply. The conveyor belt 1 has two longitudinal edges 4 and 6 and two "joining" edges 8 and 10. In the example of FIGS. 3 to 9, the longitudinal edges 4 and 6 and the joining edges 8 and 10 are straight. The longitudinal edges 4 and 6 extend parallel to a longitudinal direction Y4.6. In operation, the longitudinal direction Y4.6 is parallel and corresponds to the direction of travel of the cardboard 3 in the converting machine 51.

The belt body 2 is in this case made of polyester fabric with a polyurethane coating. The belt body 2 is suitable for conveying cardboard 3 because the coefficient of friction thereof keeps the cardboard 3 in place. The conveyor belt 1 has a width W1 of about 2 m perpendicular to the longitudinal direction Y4.6. The length L1 of the conveyor belt 1 when unrolled is approximately 10.5 m in the longitudinal direction Y4.6.

Furthermore, the conveyor belt 1 comprises an assembly member (see FIGS. 7 and 8), in this case a fastening member 12. The fastening member 12 comprises a fastening rod 12.1 and two sets of buckles 12.2. Each set of buckles 12.2 is linked to one joining edge 8 or 10. The fastening member 12 is arranged to join the joining edges 8 and 10. The fastening member 12 is in this case composed of polyester fabric and polyamide buckles. Thus, the fastening member 12 has a high mechanical strength for a low weight and cost.

Figure 4:
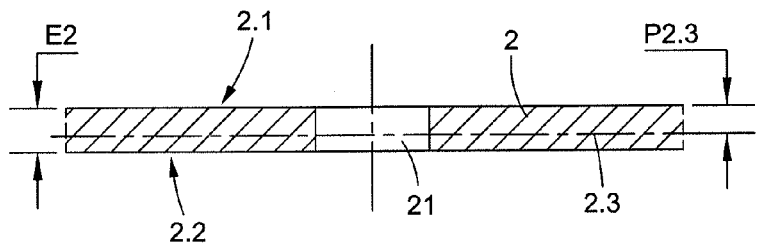
FIG. 4 is a section along the segment IV of FIG. 3.

As shown in FIG. 4, the belt body 2 has a support surface 2.1 shaped to support the cardboard 3, and a rolling surface 2.2, designed to cooperate with the drive members of the converting machine 51. The fastening member 12 is positioned between the support surface 2.1 and the rolling surface 2.2, such that the fastening member 12 is set back from the support surface 2.1 and is set back from the rolling surface 2.2. The fastening member 12 does not protrude on the support surface 2.1 or on the rolling surface 2.2 so as not to hinder the movement of the strip 1.

The belt body 2 has a thickness E2, of about 3.7 mm for example. The belt body 2 has a neutral fiber 2.3, which is positioned at the same depth P2.3 as the fastening rod 12.1.

In other words, the fastening member 12 is embedded in the thickness of the conveyor belt 1. Thus, the fastening member 12 ensures that there is no break in the properties of the conveyor belt 1 at the joining edges 8 and 10, in particular the coefficient of friction.

After the joining edges 8 and 10 have been joined by the fastening member 12, the conveyor belt 1 is a closed loop, which allows the conveyor belt 1 to be driven in endless rotation by rollers 52.

Figure 6:
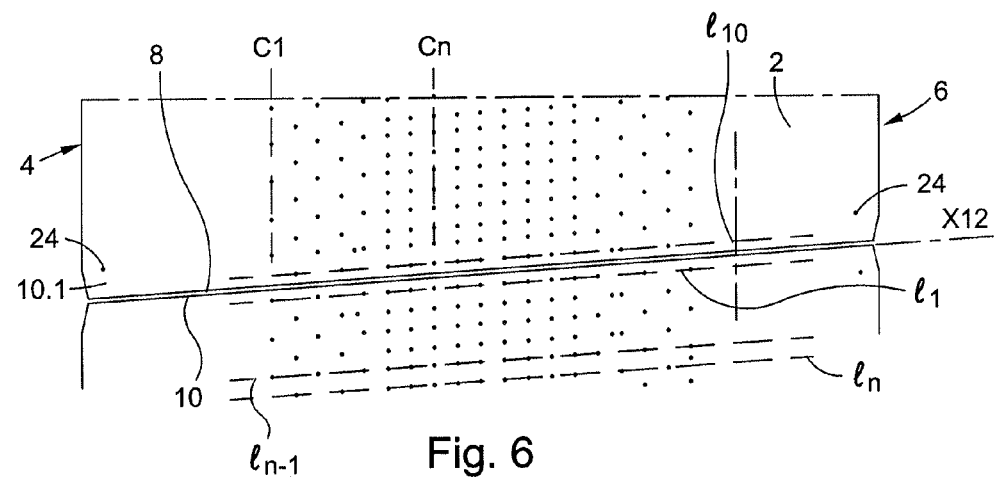
FIG. 6 is an enlarged view of both joining edges of the belt when assembled.
Figure 7:
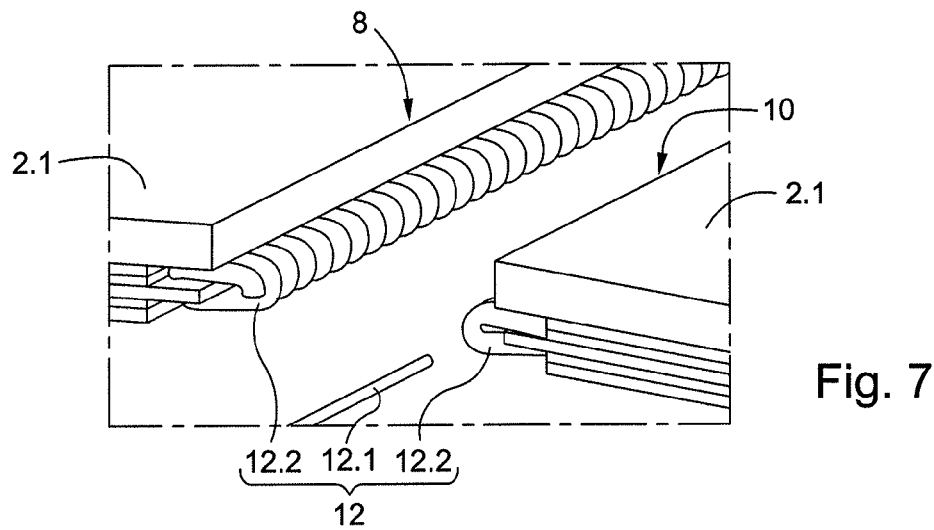
FIG. 7 is a perspective view on a large scale showing part of an assembly member with the belt in the non-assembled state.
Figure 8:
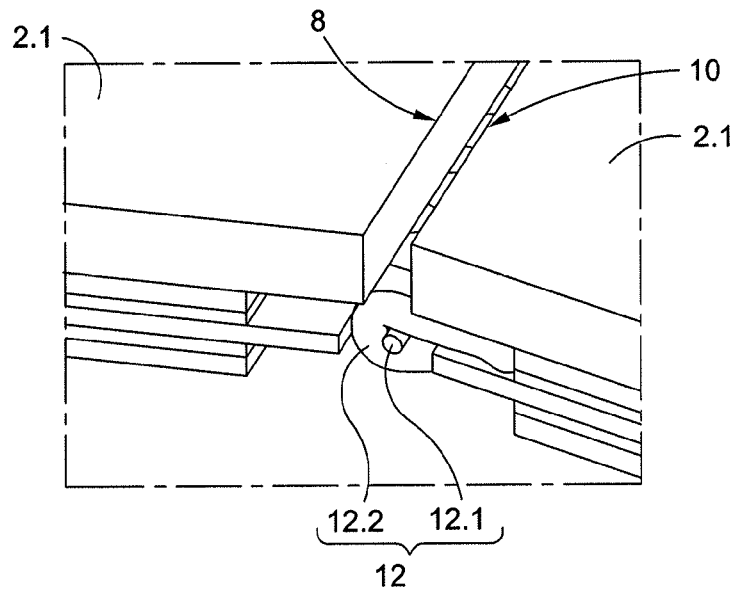
FIG. 8 is a view of the assembly member of FIG. 7 with the belt in the assembled state.

As shown in FIGS. 2, 6 and 8, when the conveyor belt 1 is assembled, the fastening rod 12.1 extends in an assembly direction X12 which is oblique to the longitudinal direction Y4.6. The assembly direction X12 is in this case straight, allowing easy manufacture of the joining edges 8 and 10 and rapid assembly of the fastening member 12 in the conveyor belt 1.

The assembly direction X12 and the longitudinal direction Y4.6 make between them an acute fastening angle A12, equal to 86 degrees. Correspondingly, the assembly direction X12 and the longitudinal direction Y4.6 make between them an obtuse angle equal to 94 degrees, this obtuse angle being the supplementary angle to the fastening angle A12. Thus, the fastening angle A12 optimizes the ratio between the quality of the register and the lateral sliding of the conveyor belt 1.

The belt body 2 has a plurality of perforations 21 distributed over a central region 22, which extends between the longitudinal edges 4 and 6. By means of these perforations, a vacuum is obtained on the support surface 2.1 to press the cardboard 3 against the conveyor belt 1 and hold it in place. The central region 22 in this case has a width W22 of approximately 1.1 m perpendicular to the longitudinal direction Y4.6, which represents about 50% of the width W1 of the conveyor belt 1.

The perforations 21 are preferably distributed in a central region 22 extending between the longitudinal edges 4 and 6. The central region has a width W22, measured perpendicular to the longitudinal edges 4 and 6, which represents between 30% and 70% of the width W1 of the belt body 2.

The perforations 21 are distributed over three longitudinal zones, dividing the central region 22 in three lengthwise.

The three zones are a central longitudinal zone 22a and two lateral longitudinal zones 22b. The two lateral zones 22b are located on either side of the central zone 22a.

The central zone 22a has a high density of perforations 21. The two lateral zones 22b have a lower density of perforations 21. This difference in density means that the cardboard 3 is held in place evenly. The vacuum obtained through the perforations 21 is constant for cardboard 3 with a small width covering only the central zone 22a. The vacuum obtained through the perforations 21 is constant and is even for cardboard 3 having a greater width covering both the central zone 22a and the lateral zones 22b.

The perforations 21 are distributed in several successive lines $l_1$ to $l_n$ to form a regular pattern and to facilitate preparation of the belt 1. Preferably, the lines $l_1$ to $l_n$ of perforations 21 are substantially parallel to one another and substantially parallel to the assembly direction X12. The perforations 21 are distributed in several successive columns $c_1$ to $c_n$, so as to form a regular pattern. The columns $c_1$ to $c_n$ of perforations 21 are substantially parallel to one another, longitudinal, and parallel to the longitudinal direction Y4.6, and are thus substantially parallel to the longitudinal edges 4 and 6. This arrangement of the lines $l_1$ to $l_n$ and columns $c_1$ to $c_n$ in relation to each other allows a homogeneous vacuum to be obtained on the support surface 2.1.

Perforations 21 are advantageously provided in immediate proximity to the fastening member 12. In other words, the body 2 has a perforation line $l_1$ right up close to one of the joining edges 8. The same goes for the other joining edge 10. By having perforations 21 close to the joining edges 8 and 10, there is no break in the vacuum when the belt 1 is assembled by fastening. Accordingly, a cardboard 3 positioned over the join at the joining edges 8 and 10 will be held in place by the vacuum in the same way as cardboard 3 positioned in a different place on the support surface 2.1 of the body of the belt 1.

The perforations 21 are positioned in such a way that the shortest distance between one perforation 21 provided at one of the joining edges 8 and another contiguous perforation 21 provided at the other of the joining edges 10 is substantially equal to the shortest distance between two other contiguous perforations 21 provided in the belt body 2. Likewise, the distance between the line of perforations $l_1$ closest to one of the joining edges 8 and the line of perforations $l_{10}$ closest to the other joining edge 10 is substantially equivalent to the distance between two contiguous lines $l_{n-1}$ and $l_n$ (see FIG. 6).

Figure 5:
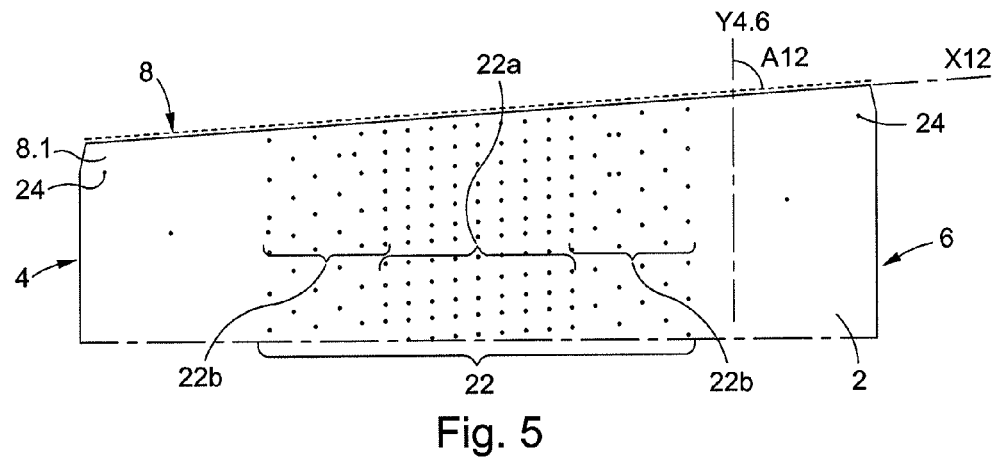
FIG. 5 is an enlarged view of a joining edge.

The belt body 2 has four holes 24, each positioned close to the longitudinal edges 4 and 6 (see FIGS. 5 and 6). Each hole 24 is a through hole, that is to say it opens out onto the support surface 2.1 and onto the rolling surface 2.2. Each hole 24 is shaped to be passed through by a pin (not shown) intended to hold the belt body 2 in place during assembly of the fastening member 12.

Thus, the conveyor belt 1 renders the converting machine 51 more productive, because the time required to replace the conveyor belt 1 is significantly reduced as it is joined up by a fastening member 12. The time needed to replace the conveyor belt 1 is in this case about 2 h.

To replace a damaged conveyor belt, the conveyor belt 1 is supplied unrolled, with the joining edges 8 and 10 free. Only a few components of the converting machine are dismantled to allow the conveyor belt 1 to be fitted.

A procedure for fitting the conveyor belt 1 comprises the steps described below. The conveyor belt 1 is supplied unrolled, that is to say without the joining edges 8 and 10 being joined together.

Figure 9:
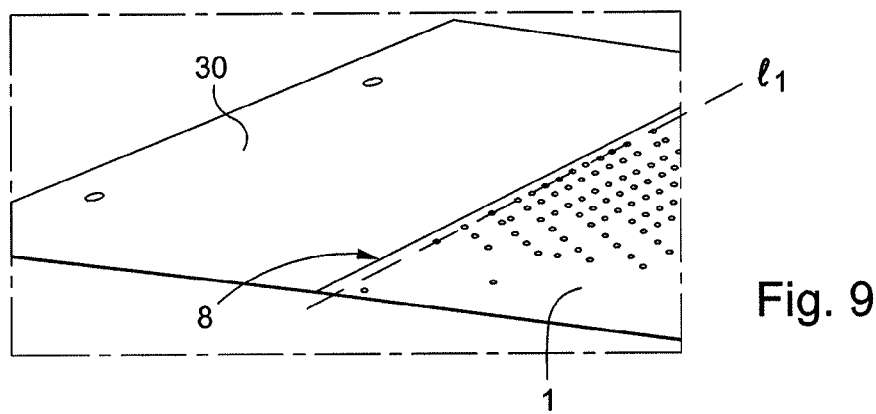
FIG. 9 is a view showing part of the conveyor belt of FIG. 3 prior to assembly.

The joining edges 8 and 10 are individually protected by a holding strip 30, which can be seen in FIG. 9 and which is attached to the joining edges 8 and 10. Each holding strip 30 has the same width W1 as the conveyor belt 1. Each holding strip 30 has a joining edge provided with a fastening member (not shown) which is similar to the fastening member 12 of the conveyor belt 1.

The holding strips 30 are cut-out to provide points of attachment for the straps required for fitting in the converting machine 51. The holding strips 30 also constitute a means of protection that is essential for easy fitting of the fastening rod 12.1 on a conveyor belt 1 with a width W1 of between 1 m and 3 m.

The conveyor belt 1, together with the two holding strips 30, is placed in the converting machine 51. The two holding strips 30 are then removed, thereby freeing the joining edges 8 and 10, allowing the conveyor belt 1 to be assembled. The present invention is not limited to the embodiments described and illustrated. Many modifications may be made without thereby exceeding the scope as defined by the claims.

The invention claimed is:

1. A conveyor belt, for conveying plate elements along a longitudinal direction, in a machine for converting the plate elements, the conveyor belt comprising:
    a belt body that comprises longitudinal edges, joining edges including a first joining edge and a second joining edge, and a support surface shaped for supporting the plate elements, and
    at least one assembly member arranged to join the first joining edge with the second joining edge, the least one assembly member extending in a direction of assembly which is oblique to the longitudinal direction,
    wherein the belt body has a plurality of perforations disposed for obtaining a vacuum on the support surface to immobilize the plate elements on the belt body, and
    wherein perforations of the plurality of perforations are provided in immediate proximity to the at least one assembly member such that a shortest distance between a first perforation of the plurality of perforations formed at the first joining edge and a second perforation of the plurality of perforations formed at the second joining edge is equal to a shortest distance between two perforations of the plurality of perforations formed in the belt body.

2. A conveyor belt according to claim 1, wherein the direction of assembly and the longitudinal direction define an acute angle of assembly substantially between 75° and 88°.

3. A conveyor belt according to claim 2, wherein the acute angle is between 85° and 87°.

4. A conveyor belt according to claim 2, wherein the acute angle is equal to 86°.

5. A conveyor belt according to claim 1, wherein the direction of assembly is straight.

6. A conveyor belt according to claim 1, wherein the perforations are distributed in several lines.

7. A conveyer belt according to claim 6, wherein the lines are substantially parallel to the direction of assembly.

8. A conveyor belt according to claim 1, wherein the perforations are distributed in a central region extending between the longitudinal edges and having a width, measured perpendicular to the longitudinal edges, which represents between 30% and 70% of the width of the belt body.

9. A conveyor belt according to claim 1, wherein perforations of the plurality of perforations are distributed over three zones, a central zone having a high density of perforations, and two lateral zones on either side of the central zone having a lower density of perforations.

10. A conveyor belt according to claim 1, wherein the belt body has at least two holes, preferably positioned close to a respective longitudinal edge, each hole being designed to be passed through by a pin for holding the belt body in place during assembly of the assembly member.

11. A conveyor belt according to claim 1, wherein the belt body has a rolling surface designed to interact with drive members to drive the conveyor belt, the assembly member being positioned between the support surface and the rolling surface, such that the assembly member is set back from the support surface and from the rolling surface.

12. A conveyor belt according to claim 1, wherein the belt body is comprised of a polymer and/or elastomer.

13. A machine for converting elements comprising: at least one conveyor belt according to claim 1, mounted around a chamber capable of generating a vacuum on the support surface.

14. A machine according to claim 13, wherein the machine is a printing machine.

15. A conveyor belt according to claim 1, wherein the belt body is comprised of polyester fabric with a polyurethane coating.

16. A conveyor belt, for conveying plate elements along a longitudinal direction, in a machine for converting the plate elements, the conveyor belt comprising:
 a belt body that comprises longitudinal edges, joining edges including a first joining edge and a second joining edge, and a support surface shaped for supporting the plate elements, and
 at least one assembly member arranged so as to join the first joining edge with the second joining edge, the least one assembly member extending in a direction of assembly which is oblique to the longitudinal direction,
 wherein the belt body has a plurality of perforations disposed for obtaining a vacuum on the support surface to immobilize the plate elements on the belt body, and
 wherein perforations of the plurality of perforations are distributed over three zones, a central zone having a high density of perforations, and two lateral zones on either side of the central zone having a lower density of perforations.

17. A conveyor belt according to claim 16, wherein perforations of the plurality of perforations are provided in immediate proximity to the at least one assembly member such that a shortest distance between a first perforation of the plurality of perforations formed at the first joining edge and a second perforation of the plurality of perforations formed at the second joining edge is equal to a shortest distance between two perforations of the plurality of perforations formed in the belt body.

\* \* \* \* \*